US007863779B1

(12) United States Patent
Pineda (10) Patent No.: US 7,863,779 B1
(45) Date of Patent: Jan. 4, 2011

(54) ENERGY MANAGEMENT AND POWER DISTRIBUTION METHOD AND SYSTEM

(76) Inventor: Andres Pineda, 60 Madrona Ave., Belvedere, CA (US) 94920

( * ) Notice: Subject to any disclaimer, the term of this patent is extended or adjusted under 35 U.S.C. 154(b) by 487 days.

(21) Appl. No.: 12/110,353

(22) Filed: Apr. 28, 2008

(51) Int. Cl.
*H01H 9/54* (2006.01)
(52) U.S. Cl. ............................................. 307/140
(58) Field of Classification Search ............... 307/140
See application file for complete search history.

(56) References Cited

U.S. PATENT DOCUMENTS 7,516,106 B2 * 4/2009 Ehlers et al. ................ 705/412

2010/0250721 A1 * 9/2010 Sohn ........................... 709/223

* cited by examiner

*Primary Examiner*—Robert L. Deberadinis (57) ABSTRACT

An energy management and power conversion method and system that may reduce wasted energy in one or more ways. One method is by providing one or more management control points, such as a web based computer and a programming means for overall monitoring and control of a power distribution system. Another is by providing one or more power controllers that may manage one or more AC to DC power supplies and optionally one or more batteries so that they operate in an efficient manner. Another method is by providing power to one or more DC controllers that may be individually enabled and disabled to shut down power to connected end user devices to conserve energy.

15 Claims, 7 Drawing Sheets

ENERGY MANAGEMENT AND POWER DISTRIBUTION METHOD AND SYSTEM

CROSS-REFERENCE TO RELATED APPLICATIONS

None.

FEDERALLY SPONSORED RESEARCH

None.

SEQUENCE LISTING OR PROGRAM

None.

BACKGROUND OF THE PRESENT INVENTION

1. Field of Invention

The present invention relates generally to energy management and particularly for computerized power distribution and control.

2. Background of the Invention

According to the Electric Power Research Institute (EPRI), nearly 2.5 billion electrical products containing power supplies are currently in use in the United States, and about 400 to 500 million new power supplies (linear and switching) are sold in the U.S. each year. The total amount of electricity that flows through these power supplies is more than 207 billion kWh/year, or about 6% of the national electric bill.

Power supplies can be located within the devices they are intended to power (internal) or outside of the product in a separate housing. Typical applications that have an external power supply include cordless phones and answering machines, video games, computer speakers, and cordless tools. Most external power supplies are linear power supplies with efficiencies in the range of 30% to 40%.

Typical application of internal power supplies are in personal computer, servers, televisions, monitors, and a wide range of electronic appliances. Most internal power supplies currently in the market are switch-mode power supplies, which have efficiencies in the range of 65% to 70%.

Electronic devices are increasingly being designed and built to use lower voltages at higher currents. Yet, just about every electronic device has to obtain its power from a 120VAC supply (or 220VAC in other countries), because that is what is available from the wall plug. Having to convert from 120VAC to 5V and lower voltages using typical power supplies is very wasteful. Designing for power efficiency is not a priority for power supply manufacturers, because as efficiency increases, the cost of the power supply increases as well.

There are alternative approaches to using individual inefficient power supplies in each device. One approach is to centralize the AC to DC conversion and improve the conversion process using better quality power supplies. Instead of having an AC to DC power supply in each device, there is an advantage to providing a power controller that converts AC into DC power that can be shared across several devices. By consolidating the AC to DC power supplies into the power controller and managing the power distribution, efficiencies of scale come into play. This approach is ideally suited in an enterprise that incorporates a large number of DC devices. It is advantageous for the approach to be comprised of one or more network accessible management control points that provide monitoring and control, one or more distributed power controllers that may consolidate the AC to DC power conversion, and one or more DC controllers that may perform DC to DC conversion of the voltage at or near the final stage of distribution as needed by the end user devices.

PRIOR ART

The following similar prior art references are cited and disadvantages noted:

U.S. Pat. No. 4,495,568 to Gilbert, Takats et al. describes an apparatus for controlling and monitoring a modular power supply system for supplying power to a data processing system and the like that includes a plurality of power sources allocated among a plurality of power supply subsystems in a predetermined configuration. The disadvantage of said prior art is that it describes a system and subsystems that are adjacently located which limits where it can be used. It requires preconfigured parameters that indicate the type of sources and devices. This approach requires that the addition of new sources and devices be preconfigured into the system. The prior art does not analyze power usage and does not provide a means to disable end user devices to conserve energy. The prior art does not include remote management which would be advantageous for centralized control.

U.S. Pat. No. 4,611,289 to Coppola, Anthony F. describes a power management system for providing power to one or more computers having provisions for communication with an external data source. A source of backup power, including a bank of batteries, is provided which is provided to the power bus during a utility power interruption. The disadvantage of said prior art is that it requires a source of backup power which may not be available. The prior art does not analyze power usage and does not provide a means to disable end user devices to conserve energy. The prior art does not include remote management which would be advantageous for centralized control.

U.S. Pat. No. 4,747,041 to Engel, Gary L. et. al. describes a selective, non-manual power controller that provides the selective, non-manual power control of various components of a data processing equipment from and reports the power status of such components to a central location. The disadvantage of said prior art is that it requires an identical redundant microcontroller which can be cost prohibitive and it does not analyze power usage and does not provide a means to disable end user devices to conserve energy. The prior art only reports status to a central location, but does not include remote control which would be advantageous for managing remote devices.

U.S. Pat. No. 5,481,730 to Alan E. Brown et al. describes a power supply monitoring and control circuit using a microcontroller to remotely monitor and control the functions and conditions of a power supply. The prior art does not analyze power usage and does not provide a means to disable end user devices to conserve energy. The prior art requires a serial port to communicate to the host which limits the connection distance to the host and does not avail itself of the benefits of a network solution.

U.S. Pat. No. 6,526,516 to Ishikawa, Hisashi et. al. describes a system to which a plurality of devices is connected, each device has heretofore required a connector for an AC adapter and a connector for a signal line. The disadvantage of said prior art is that it does not provide AC to DC conversion. The prior art does not analyze power usage and does not provide a means to disable end user devices to conserve energy.

U.S. Pat. No. 6,614,133 to Belson, Steve and Harris, Shaun L. describes a system having multiple power supplies with outputs connected in parallel; the number of supplies providing current is controlled to improve the overall system efficiency. The prior art does not provide a means to disable end user devices to conserve energy. The prior art does not include remote management which would be advantageous for centralized control. There may also be situations where requiring multiple power supplies is cost prohibitive.

U.S. Pat. No. 6,633,823 to Bartone, Erik J., et. al., provides a system and method for real time monitoring and control of energy consumption at a number of facilities to allow aggregate control over the power consumption. The disadvantage of said prior art is that it requires the power control device to be interconnected between said power consuming device and a standard power distribution metering device, which limits where the system can be installed. Furthermore, the prior art does not provide a means for power conversion or provide for consolidating power supplies to conserve energy.

U.S. Pat. No. 7,010,589 to Carrell W. Ewing et al. describes an SNMP network that comprises a power manager with an SNMP agent in TCP/IP communication over a network with an SNMP network manager. The power manager is connected to control several intelligent power modules each able to independently control the power on/off status of several network appliances. The disadvantage of said prior art is that it requires an SNMP agent to analyze power usage. Running an SNMP agent can only be achieved in devices that are intelligent enough to operate this protocol and cannot be used in devices that do not have SNMP capabilities.

U.S. Pat. No. 7,099,934 to Carrel W. Ewing, et. al. describes power management method comprising: providing power to a power input of a local power distribution apparatus comprising (i) a vertical housing vertically mounted to a vertical electrical equipment rack. The disadvantage of said prior art is that it requires a vertical housing and there may be situations where a vertical electrical rack may not be suitable due to space constraints. The prior art only controls power outlets and does provide for consolidating power supplies to improve power conversion efficiency.

U.S. Pat. No. 7,181,517 to layergne, Marc et. al., describes a modular master control unit of the telecommunications power system communicates via a data bus with the associated modular rectifier units, distribution unit(s) and battery connection unit(s) to collect operating state information from the neuron processors of those units and store that information in a database. The prior art requires the use of neuron processors which is disadvantageous because it is limited to using those proprietary processors. The prior art does not provide for consolidation of power supplies to conserve energy.

U.S. Pat. No. 7,184,905 to Stefan, Donald A. provides an electrical power (AC/DC) monitoring system remotely monitoring batteries and electrical power systems through a call center, providing continual monitoring, monthly reports, near real time viewing and service response. The disadvantage of said prior art is that it only provides for centralized reporting and does not provide for remote control of said power system. The prior art does not provide a means for AC to DC conversion, nor does it provide a means for consolidating power supplies to reduce wasted energy.

U.S. Pat. No. 7,272,732 to Farkas, Keith Istvan, et. al., describes a system where one or more computer system receives power from a power system having a maximum power output based on a nominal power consumption of the one or more computer system. The disadvantage of said prior art is that it does not provide for consolidating power supplies to improve the AC to DC conversion, nor provide a means for disabling end user devices to conserve energy.

U.S. Pat. No. 7,337,333 to O'conner, Clint H. et al. describes a system and method that are provided for strategic power supply sequencing in a computer system. The system and method includes a plurality of processing resources that process data and a plurality of power supplies that provide power for the processing resources. A power management engine adjusts the power supplies in response to processing resource changes to optimize power consumption. The disadvantage of said prior art is that it does not provide for remote monitoring and control and does not provide a means to disable end user devices to conserve energy.

United States Patent 20030065961 to Koenen, David J. describes A method and apparatus for distributing power to a plurality of computers in a network. A power management system including a feed-back mechanism is employed to monitor power consumptions of the plurality of computers. Should the overall power consumption reach a threshold, the power management system instructs the microprocessors in the plurality of computers to enter into a lower power state, such as a sleep state, for a certain duration, thus lowering overall power. The disadvantage of said prior art is that it is limited only to placing computers in standby mode. The solution does not disable the end user device and it requires the end use device to have a low power state capability. Some end user devices may not have such features. The prior art is not suitable for non-computer end user devices.

United States Patent 20060098369 to Wambsganss, Peter M et. al., describes a system whereby a power supply is provided with a microcontroller configured to adjust an output signal from the power supply. The disadvantage of said prior art is that it is limited to adjust the output electrical parameters, such as the voltage that is produced. It does not provide for remote monitoring and control, or for consolidating power supplies to improve the AC to DC conversion, nor does it provide a means to disable the end user devices to conserve power.

United States Patent 20070005994 to Bahali, Sumanta K. et al., describes a power management server data processing system for managing power consumption among a plurality of server data processing systems that are contained within a single location. The said prior art is for server systems that are contained within a single location which does not address other types of computer systems, such as desktops and requires the computers to be is a single location. This is disadvantageous where the computers are located in multiple locations.

United States Patent 20080072081 to Helfinstine et al. describes a system and method for dynamically managing groups of power supplies for a computer system. The disadvantage of said prior art is that it does not provide for remote management and requires the grouping of power supplies, which requires multiple power supplies that may be cost prohibitive.

PRIOR ART SUMMARY

Prior art that are available in the marketplace, and that are heretofore known, suffer from one or more of the following disadvantages:
  The prior art is limited to supplying power to devices within an enclosed structure and therefore limit the advantages to devices within the enclosure.
  The prior art is limited to only activating and deactivating AC electrical power outlets, which does help during the AC to DC conversion at the end user device.
  The prior art do not provide a means for AC to DC power conversion and therefore only distributes AC power.

The prior art does not include a means to manage and control one or more AC to DC power supplies based on load demand and therefore cannot improve the conversion by sharing power supplies.

The prior art do not include a means of monitoring the activity of the end user device which may be used to calculate signature patterns of inactivity.

The prior art do not include a means to enable or disable power to one or more end user devices based on a programmable schedule which can reduce wasted energy of unused devices after working hours, on weekends, and holidays.

The prior art do not include a means to enable or disable power to one or more end user devices based on an external event, such as a need to conserve power due to critical peak electrical use which may result in brown outs or outages.

The prior art do not include a means to keep power supplies turned off to conserve energy until power demand requires that they be powered up.

The prior art do not provide a means for remote management and control which can be advantageous in conserving energy across many locations or for a large number of end user devices.

The prior art are limited to specific types of devices, such as computers and is not suitable for other types of end user devices.

SUMMARY

The present invention is an energy management and power conversion method and system that may reduce wasted energy in one or more ways. One method is by providing one or more management control points, comprising of a computer and a programming means for overall monitoring and control of a power distribution system across a network. Another is by providing one or more power controllers that may manage one or more AC to DC power supplies and optionally one or more batteries so that they may be shared by several end user devices and so that they may operate in an efficient manner. Another method is by providing power to one or more DC controllers that may be individually enabled and disabled to shut down power to connected end user devices to conserve energy.

A more complete understanding of the method and system for will be afforded to those skilled in the art, as well as a realization of additional advantages and objects thereof, by a consideration of the following description of one or more embodiments. Reference will be made to the appended sheets of drawings, which will first be described briefly.

DESCRIPTION OF THE FIRST EMBODIMENT

Energy Management and Power Conversion for Desktop PCs

Referring now to the drawings, in which similar or corresponding parts are identified with the same reference number, the first embodiment is generally depicted in FIG. 1 through FIG. 5.

Figure 1:
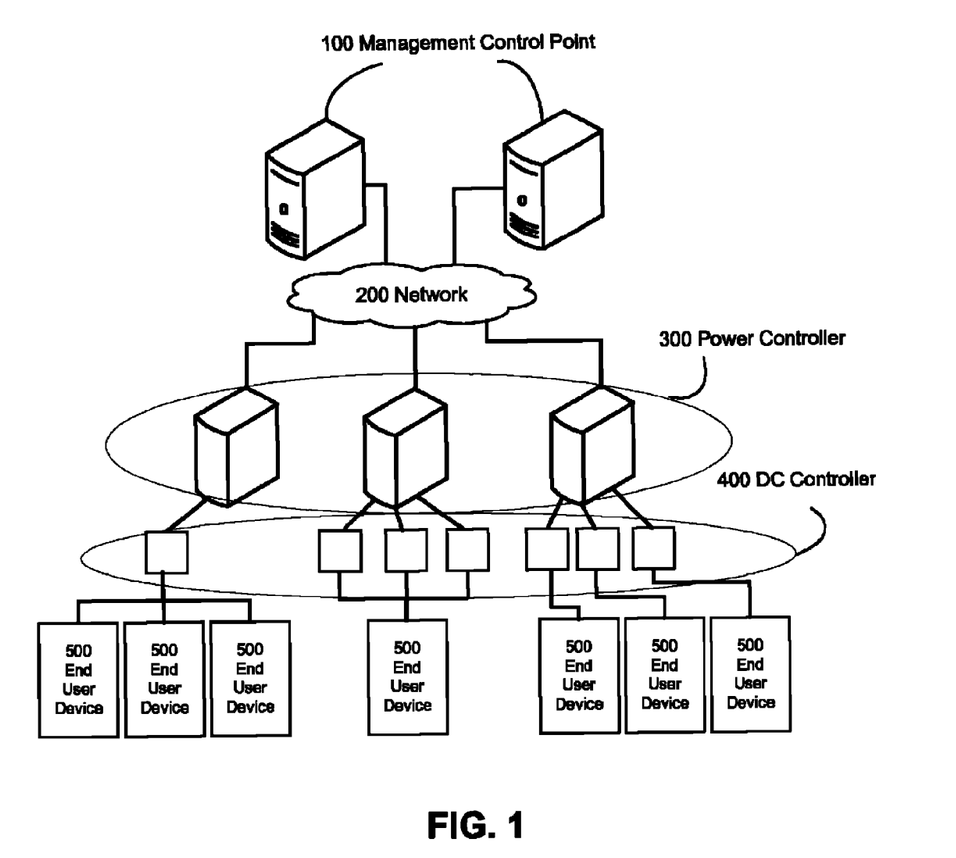
FIG. 1 is an overview of a first embodiment showing some of the major components.

FIG. 1 depicts some of the components that comprise the first embodiment: one or more management control point 100 which provides overall monitoring and control, a network 200 that connects the one or many management control point 100 with the one or many power controller 300, and the one or many DC controller 400 that may provide power to the one or more end user devices 500.

Figure 2:
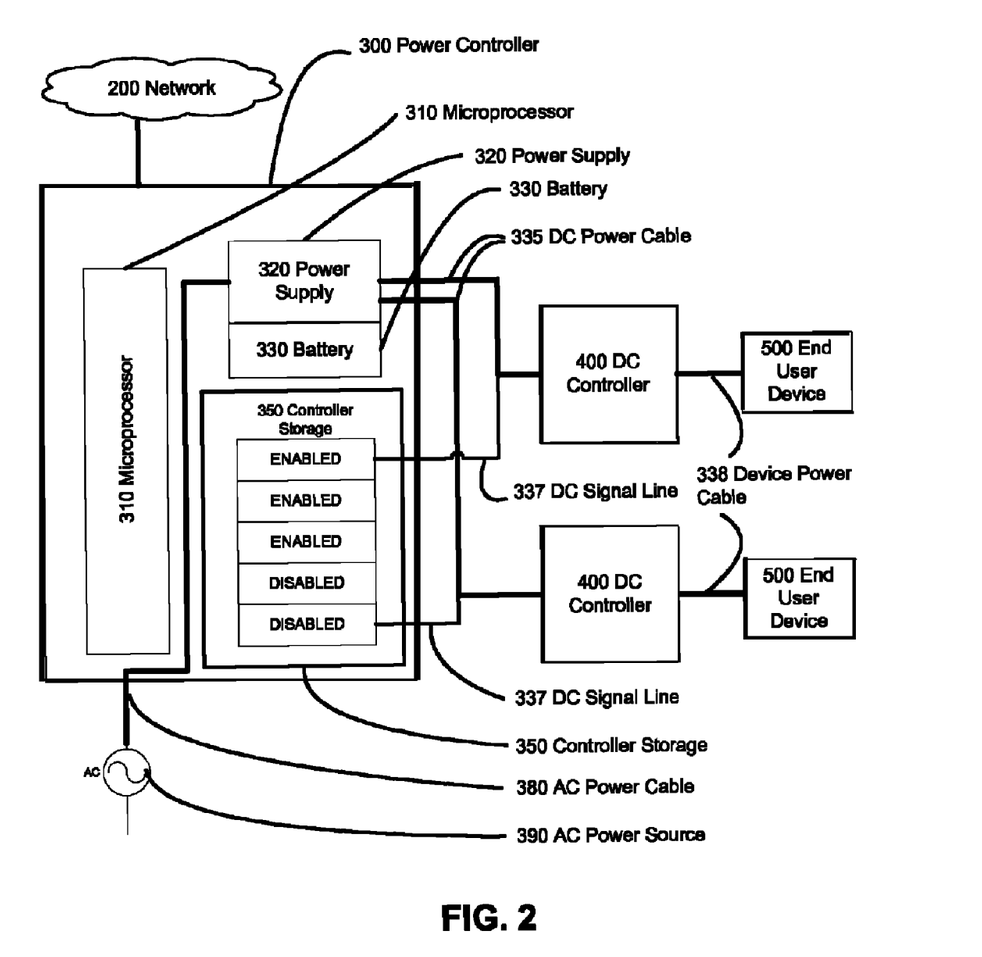
FIG. 2 is a more detailed view of some of the components in the power controller.

FIG. 2 is a more detailed view and depicting some of the components of the one or more power controller 300, which comprises of a microprocessor 310 that manages one or more power supply 320 and optionally one or more battery 330. The controller storage 350 may be used by the microprocessor 310 to maintain the present enabled state of the one or more DC controller 400. The one or more power controller 300 may be connected to and provide power to the one or more DC controller 400 via the DC power cable 335. The DC power cable 335 contain one or more DC signal line 337 that may be used to enable and disable the one or more DC controller 400.

Figure 3:
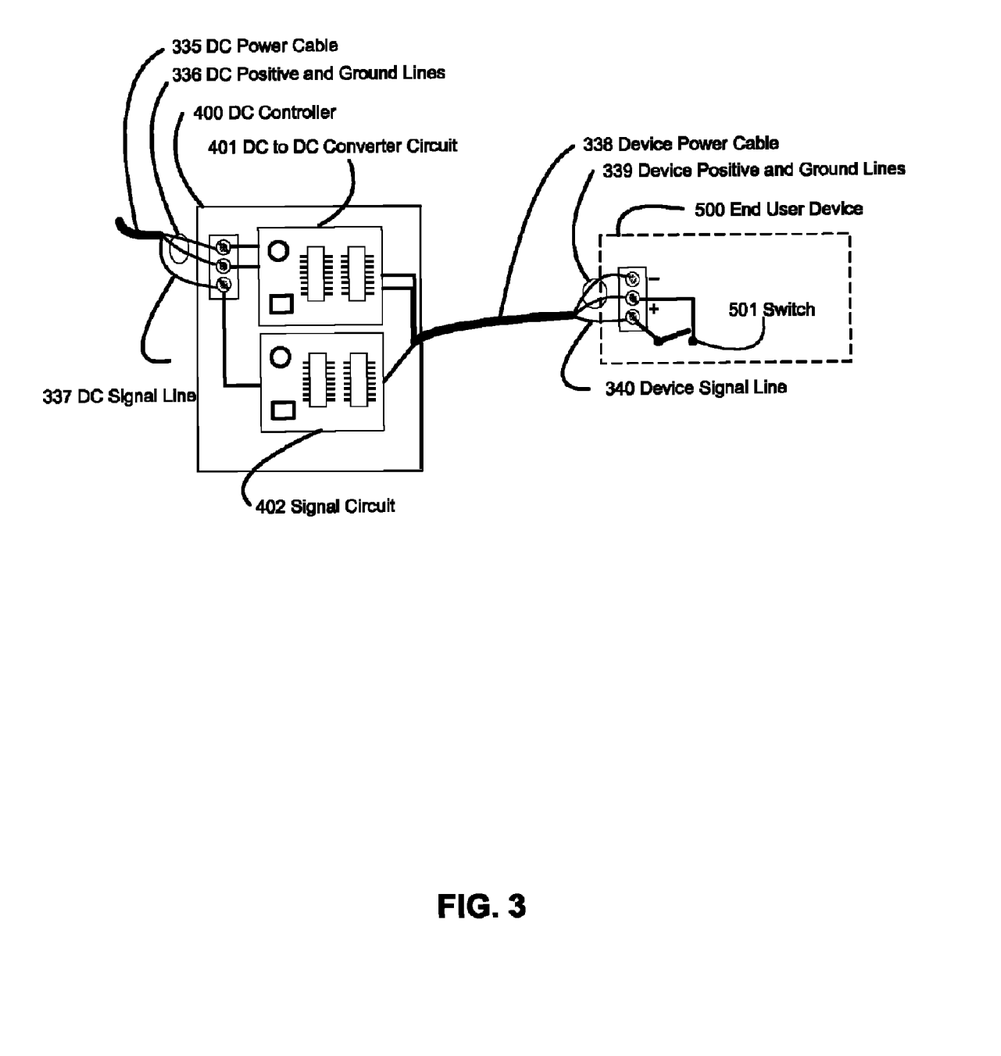
FIG. 3 is a more detailed view of some of the components in the DC controller.

FIG. 3 is a more detailed view of some of the components of the DC controller 400 and depicts one or more of the ways it may connected to the end user device 500. In FIG. 3, the DC power cable 335 is shown to be comprised of one or more DC positive and ground lines 336 and one or more DC signal line 337. The DC positive and ground lines 336 may provide DC power and may be used by the DC to DC converter circuit 401 to step up or step down the input voltage into a voltage suitable to the end user device 500. The DC signal line 337 may be used by the signal circuit 402 to enable and disable the DC controller 400. The DC to DC converter circuit 401 may provide power to the one or more end user device 500 via the device power cable 338. The device power cable 338 may be comprised of one or more device positive and ground lines 339 and one or more device signal line 340. The device positive and ground lines 339 may provide DC power to the one or more end user device 500. The device signal line 340 may be connected to a switch 501. The device signal line 340 may be monitored by the signal circuit 402 so as to recognize when an end user device 500 has made an electrical connection on said device signal line 340, such as by the closing of a switch 501. Said signal circuit 402 may convey said electrical connection to the microprocessor 310 via the DC signal line 337.

Figure 4:
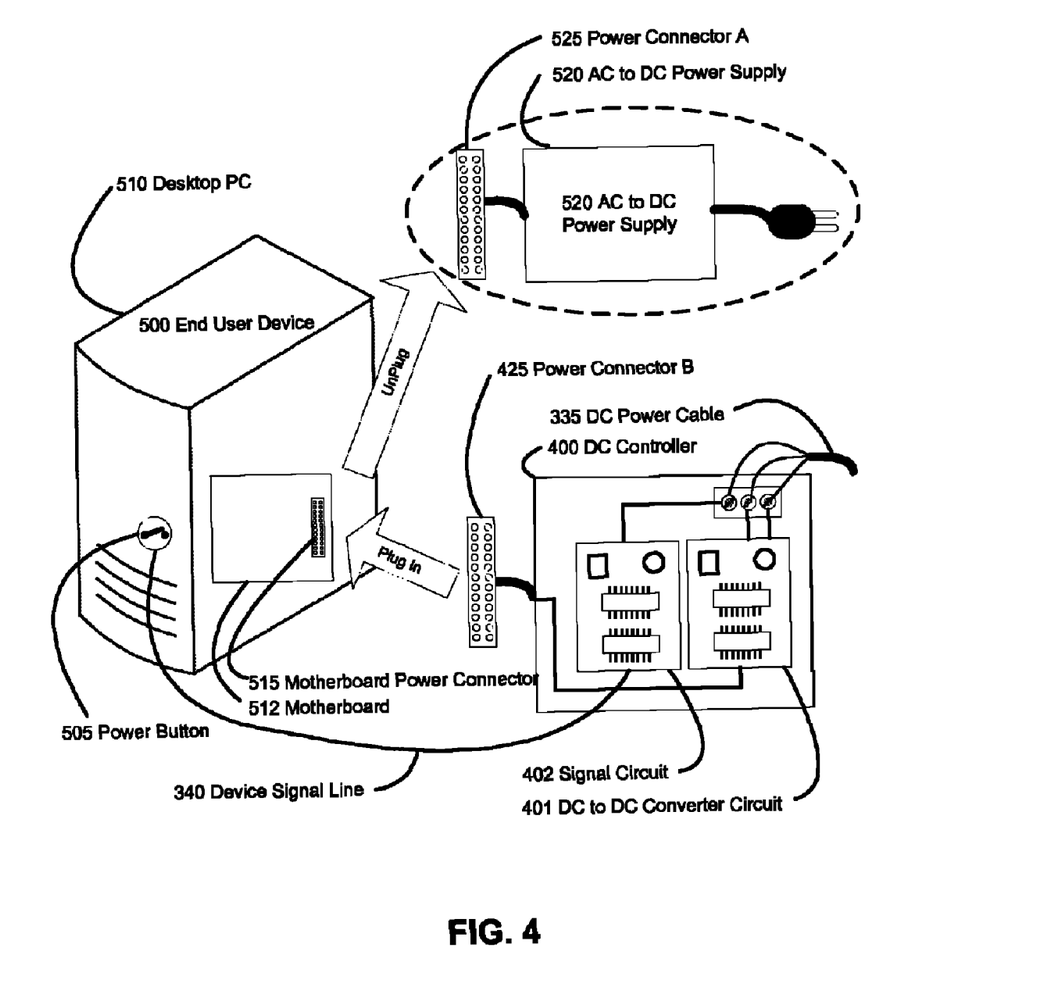
FIG. 4 is a depiction of a first embodiment where the end user device may be a Desktop PC.

FIG. 4 depicts the first embodiment where the end user device 500 may be a desktop PC 510. The AC to DC power supply 520 of the desktop PC 510 may be electrically disconnected from the motherboard 512, by unplugging the power connector A 525 from the motherboard power connector 515. An embodiment of the DC controller 400 is depicted as having a corresponding power connector B 425 that may provide the required power to the motherboard 512 by plugging into the motherboard power connector 515. The device signal line 340 may be connected to the power button 505 within or adjacent to the desktop PC 510. This connection creates an electrical signal when the power button 505 is switched on and off. Said electrical signal may be monitored and acted upon by the signal circuit 402 within the DC controller 400.

Figure 5:
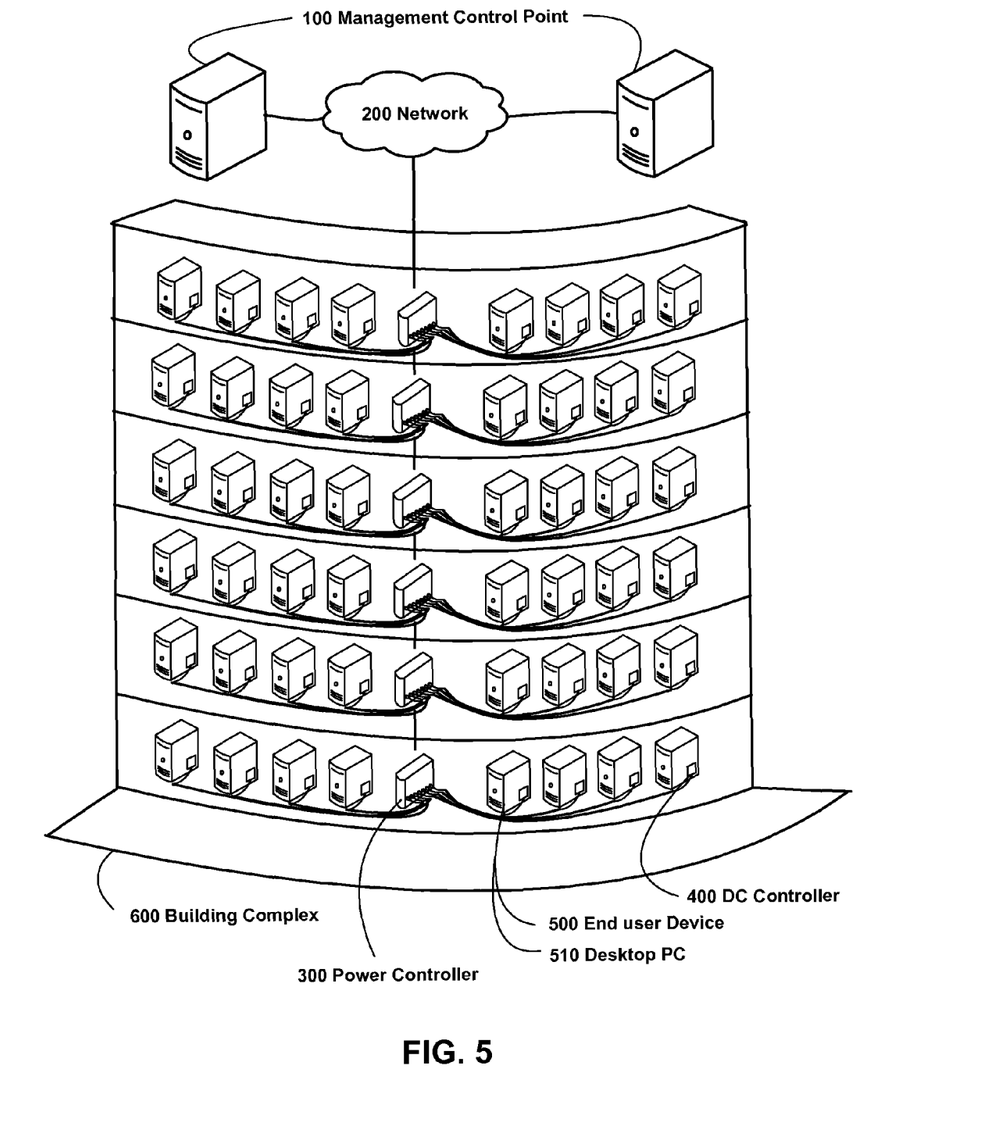
FIG. 5 is a depiction of the typical, but not required, location of the components as presented in the first embodiment.

FIG. 5 depicts where the components of the first embodiment might be located within a building complex 600. One or more management control point 100 may be installed within the building complex 600 or in a remote location. Said one or more management control point 100 may be connected to a network 200, to which the one or more power controller 300 may also be connected. In this example, the power controller 300 are installed on each floor of the building complex 600. Multiple power controller 300 may be installed on the same floor, perhaps to accommodate a large number of desktop PC 510. Within each desktop PC 510, a DC controller 400 may be installed to provide DC power as explained in the previous section.

Conclusion, Ramifications, and Scope of Invention for the First Embodiment

Thus, the reader will see that the first embodiment may be used to manage and control AC to DC conversion and provide power to one or more desktop PC 510. Accordingly, one or more embodiments may have one or more of the following advantages: allows for centralized management and control of the devices, it saves energy through the consolidation of power supplies, it centralizes the management of the AC to DC conversion and power distribution process, and it may disable inactive desktop PC 510 to conserve energy. It is therefore advantageous for one or more desktop PC 510 to be powered and controlled via the described embodiment.

OPERATION OF FIRST EMBODIMENT

Energy Management and Power Conversion for Desktop PCs

Referencing FIG. 1 through FIG. 5, the following steps detail the process of operating the first embodiment:

Referring to FIG. 5, one or more power controller 300 may installed on each floor in a building complex 600, so that the power controller 300 may be connected to the one or more desktop PC 510. Each power controller 300 may be connected to the network 200. As depicted in FIG. 2, each of the power controller 300 may be plugged into an AC Power Source 390 via the AC power cable 380.

Referring to FIG. 4, each desktop PC 510 may have the internal AC to DC power supply 520 disconnected from the motherboard 512 by unplugging the power connector A 525 from the motherboard power connector 515. The AC to DC power supply 520 does not have to be removed from the desktop PC 510. One or more DC controller 400 may be installed within or adjacent to the desktop PC 510. The DC controller 400 may provide a power connector B 425, that may be plugged into the motherboard power connector 515 to provide power. Additionally, the DC controller 400 may provide a device signal line 340 that may be connected to the power button 505 of the desktop PC 510. This connection may allow an electrical signal that is monitored and acted upon by the signal circuit 402.

Referring to FIG. 5, the one or more management control point 100 may be installed at a convenient location, perhaps within the building complex 600 or at some remote location and connected to the network 200.

With all of the components in place, the first embodiment may be used to provide and mange power to desktop PCs 510.

DESCRIPTION OF A SECOND EMBODIMENT

Energy Management and Power Conversion Using a Power Panel

A second embodiment is generally depicted in FIG. 1, FIG. 2, FIG. 3, and FIG. 6.

Referring now to the drawings, in which similar or corresponding parts are identified with the same reference number.

FIG. 1 depicts some of the components that comprise the first embodiment: one or more management control point 100 which provides overall monitoring and control, a network 200 that connects the one or many management control point 100 with the one or many power controller 300, and the one or many DC controller 400 that may provide power to the one or more end user devices 500.

FIG. 2 is a more detailed view and depicting some of the components of the one or more power controller 300, which comprises of a microprocessor 310 that manages one or more power supply 320 and optionally one or more battery 330. The controller storage 350 may be used by the microprocessor 310 to maintain the present enabled state of the one or more DC controller 400. The one or more power controller 300 may be connected to and provide power to the one or more DC controller 400 via the DC power cable 335. The DC power cable 335 contain one or more DC signal line 337 that may be used to enable and disable the one or more DC controller 400.

FIG. 3 is a more detailed view of some of the components of the DC controller 400 and depicts one or more of the ways it may connected to the end user device 500. In FIG. 3, the DC power cable 335 is shown to be comprised of one or more DC positive and ground lines 336 and one or more DC signal line 337. The DC positive and ground lines 336 may provide DC power and may be used by the DC to DC converter circuit 401 to step up or step down the input voltage into a voltage suitable to the end user device 500. The DC signal line 337 may be used by the signal circuit 402 to enable and disable the DC controller 400. The DC to DC converter circuit 401 may provide power to the one or more end user device 500 via the device power cable 338. The device power cable 338 may be comprised of one or more device positive and ground lines 339 and one or more device signal line 340. The device positive and ground lines 339 may provide DC power to the one or more end user device 500. The device signal line 340 may be connected to a switch 501. The device signal line 340 may be monitored by the signal circuit 402 so as to recognize when an end user device 500 has made an electrical connection on said device signal line 340, such as by the closing of a switch 501. Said signal circuit 402 may convey said electrical connection to the microprocessor 310 via the DC signal line 337.

Figure 6:
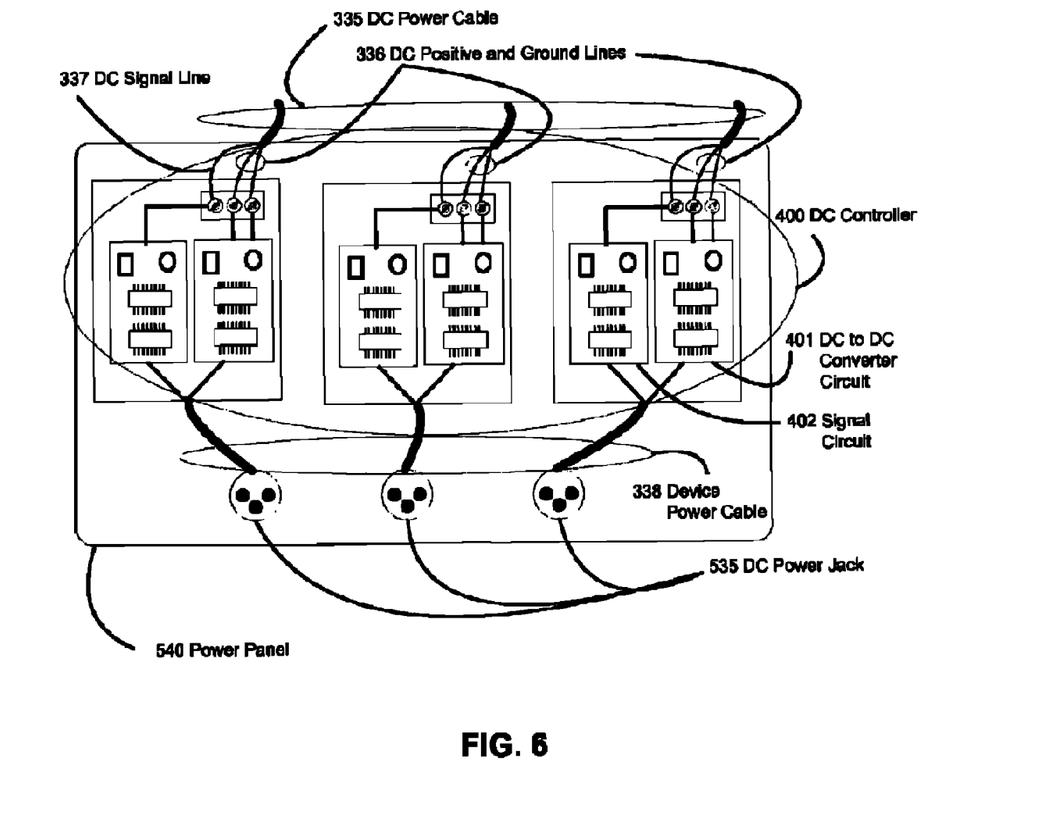
FIG. 6 is a depiction of a second embodiment—A power panel with multiple DC controllers.

FIG. 6 depicts one or more power panel 540. In this example, one or more DC controller 400 may be used to provide power to one or more DC power jack 535.

Said one or more DC power jack 535 may be any suitable type of electrical connector such as, but not limited to XLR connectors, into which end user device 500 may be connected and disconnected as needed. The DC to DC converter circuit 401 is powered by the DC power cable 335. The DC signal line 337 may also be connected to the DC power jack 535.

Conclusion, Ramifications, and Scope Oo Invention for the Second Embodiment

Thus, the reader will see that the second embodiment may be used to manage and control AC to DC conversion and provide power to one or more power panel 540 that are comprised of one or more DC Controller 400 and one or more DC power jack 335.

Accordingly, one or more embodiments may have one or more of the following advantages: allows for centralized management and control of the devices, it saves energy through the consolidation of power supplies, it centralizes the management of the AC to DC conversion and power distribution process, and it may disable inactive end user devices to conserve energy. It is therefore advantageous for DC equipment to be powered and controlled via one or more of the described embodiments.

OPERATION OF SECOND EMBODIMENT

Energy Management and Power Conversion using a Power Panel

Referencing FIG. 1, FIG. 2, FIG. 3 and FIG. 6, the following steps detail the process of operating this embodiment of the present invention:

Referring to FIG. 1, The one or more management control point 100 may be installed at a convenient location to monitor and control the overall system. The one or more power controller 300 may be installed near the end use devices 500. The one or more DC controller 400 may provide power to the connected end user devices 500.

Referring to FIG. 6 the one or more DC controller 400 may be installed within or adjacent to the one or more power panel 540. The DC controller 400 may be electrically connected to the one or more DC power jack 535 via the device power cable 338.

DESCRIPTION OF A THIRD EMBODIMENT

Energy Management and Power Conversion for DC Equipment

A third embodiment is generally depicted in FIG. 1, FIG. 2, FIG. 3, and FIG. 7.

Referring now to the drawings, in which similar or corresponding parts are identified with the same reference number.

FIG. 1 depicts some of the components that comprise the first embodiment: one or more management control point 100 which provides overall monitoring and control, a network 200 that connects the one or many management control point 100 with the one or many power controller 300, and the one or many DC controller 400 that may provide power to the one or more end user devices 500.

FIG. 2 is a more detailed view and depicting some of the components of the one or more power controller 300, which comprises of a microprocessor 310 that manages one or more power supply 320 and optionally one or more battery 330. The controller storage 350 may be used by the microprocessor 310 to maintain the present enabled state of the one or more DC controller 400. The one or more power controller 300 may be connected to and provide power to the one or more DC controller 400 via the DC power cable 335. The DC power cable 335 contain one or more DC signal line 337 that may be used to enable and disable the one or more DC controller 400.

FIG. 3 is a more detailed view of some of the components of the DC controller 400 and depicts one or more of the ways it may connected to the end user device 500. In FIG. 3, the DC power cable 335 is shown to be comprised of one or more DC positive and ground lines 336 and one or more DC signal line 337. The DC positive and ground lines 336 may provide DC power and may be used by the DC to DC converter circuit 401 to step up or step down the input voltage into a voltage suitable to the end user device 500. The DC signal line 337 may be used by the signal circuit 402 to enable and disable the DC controller 400. The DC to DC converter circuit 401 may provide power to the one or more end user device 500 via the device power cable 338. The device power cable 338 may be comprised of one or more device positive and ground lines 339 and one or more device signal line 340. The device positive and ground lines 339 may provide DC power to the one or more end user device 500. The device signal line 340 may be connected to a switch 501. The device signal line 340 may be monitored by the signal circuit 402 so as to recognize when an end user device 500 has made an electrical connection on said device signal line 340, such as by the closing of a switch 501. Said signal circuit 402 may convey said electrical connection to the microprocessor 310 via the DC signal line 337.

Figure 7:
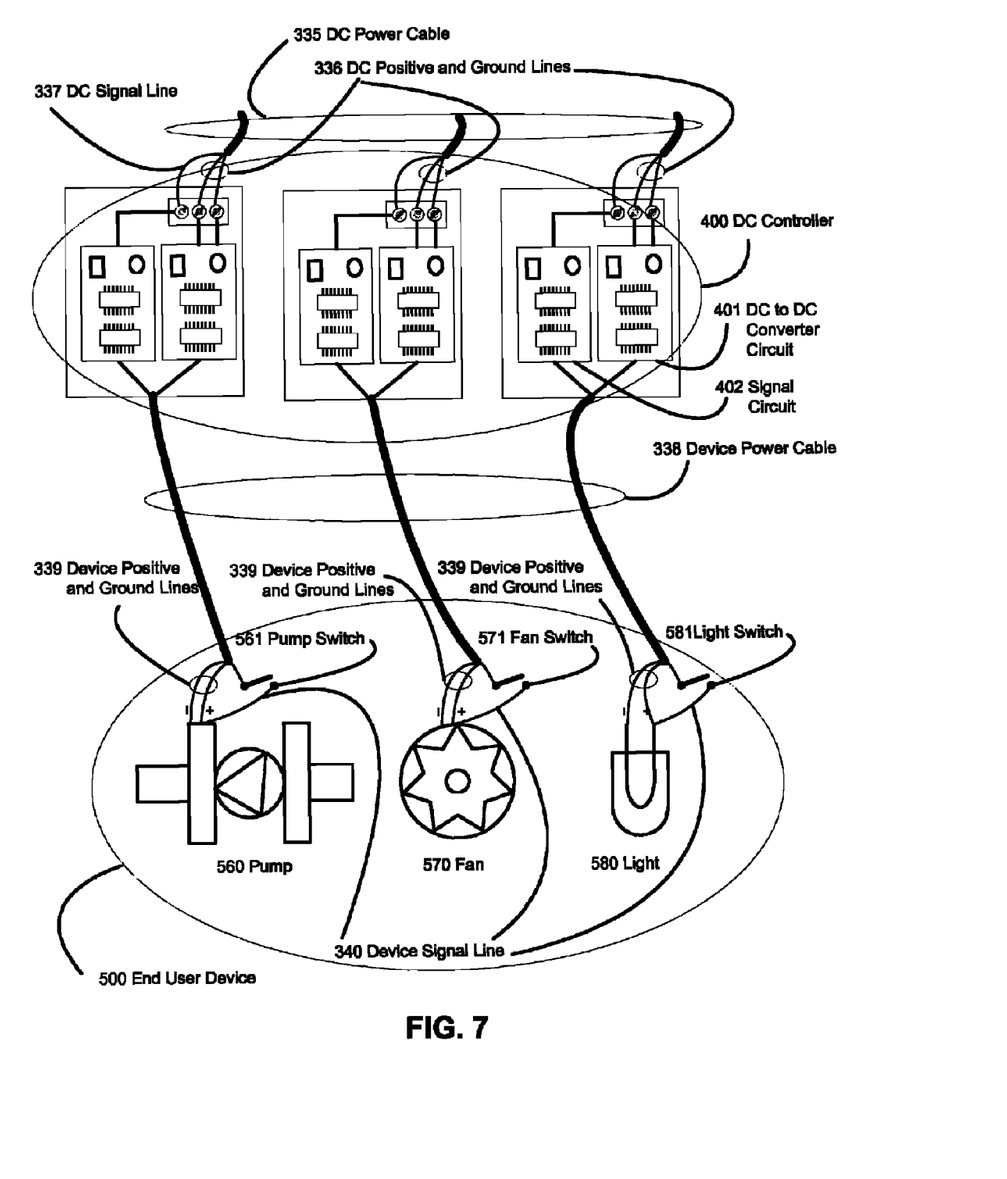
FIG. 7 is a depiction of a third embodiment—One or more DC devices connected to one or more DC controllers.

Referring to FIG. 7 one or more DC controller 400 may be installed within or adjacent to the end user device 500, which in this example are depicted as several forms of DC equipment: a pump 560, a fan 570, and a light 580. One or more pump 560 is connected to the device power cable 338 which may provide power and the pump switch 561 may be connected to the device signal line 340. This allows an electrical signal to be passed through the device signal line 340 when the pump switch 561 is turned on and off. Similarly, the one or more fan 570 may be connected to the device power cable 338 which may provide power and the fan switch 571 may connected to the device signal line 340. Additionally, the one or more light 580 may be connected to the device power cable 338 which may provide power and the light switch 581 may be connected to the device signal line 340. The signal circuit 402 may monitor and act upon the signal provided when any of the following are turned on and off: the pump switch 561, the fan switch 571, or the light switch 581.

Conclusion, Ramifications, and Scope of Invention for the Third Embodiment

Thus, the reader will see that the third embodiment may be used to manage and control AC to DC conversion and provide power to DC equipment. Accordingly, one or more embodiments may have one or more of the following advantages: allows for centralized management and control of the devices, it saves energy through the consolidation of power supplies, it centralizes the management of the AC to DC conversion and power distribution process, and it may disable inactive end user devices 500 to conserve energy. It is therefore advantageous for DC equipment to be powered and controlled via one or more of the described embodiments.

OPERATION OF THIRD EMBODIMENT

Energy Management and Power Conversion for DC Equipment

Referencing FIG. 1, FIG. 2, FIG. 3 and FIG. 7 the following steps detail the process of operating this embodiment of the present invention:

Referring to FIG. 1, The one or more management control point 100 may be installed at a convenient location to monitor and control the overall system. The one or more power controller 300 may be installed near the end use devices 500. The one or more DC controller 400 may provide power to the connected end user devices 500.

Referring to FIG. 7 one or more DC controller 400 may be installed within or adjacent to the end user device 500. The one or more DC controller 400 may be electrically connected to the one or more end user devices 500, where the device power cable 338 may provide power to the end user device 500. light switch 581 may be connected to the device signal line 340. The signal circuit 402 may monitor and act upon the signal provided when any of the following are turned on and off: the pump switch 561, the fan switch 571, or the light switch 581.

With all of the components in place, the third embodiment may be used to provide power and mange the DC equipment.

EMBODIMENTS SUMMARY

Although the descriptions in the above embodiments contain much specificity, these should not be construed as limiting the scope of the present invention, but as merely providing illustrations of some of the presently first embodiments of this invention. Thus the scope of the present invention should be determined by the appended claims and their legal equivalents, rather than by the examples given.

REFERENCE NUMERALS

100 Management Control Point
200 Network
300 Power Controller
310 Microprocessor
320 Power Supply
330 Battery
335 DC Power Cable
336 DC Positive and Ground Lines
337 DC Signal Line
338 Device Power Cable
339 Device Positive and Ground Lines
340 Device Signal Line
350 Controller Storage
380 AC Power Cable
390 AC Power Source
400 DC Controller
401 DC to DC Converter Circuit
402 Signal Circuit
425 Power Connector B
500 End User Device
501 Switch
510 Desktop PC
505 Power Button
512 Motherboard
515 Motherboard Power Connector
520 AC to DC Power Supply
525 Power Connector A
540 Power Panel
535 DC Power Jack
560 Pump
561 Pump Switch
570 Fan
571 Fan Switch
580 Light
581 Light Switch
600 Building Complex

What is claimed is:

1. A method of energy management and power distribution comprising the steps of:
   a) providing one or more management control point, comprising: a computer;
   b) providing one or more power controller, comprising: a microcomputer, one or more power supply, optionally one or more battery, a storage means;
   c) providing one or more DC controller, comprising: one or more DC to DC converter circuit, one or more signal circuit;
   d) communicating via a network between said one or more management control point and said one or more power controller;
   e) distributing power from said one or more power controller to said one or more DC controller;
   f) maintaining a present enabled state of each of said one or more DC controller by said power controller via said storage means;
   g) sending enable and disable commands for selected one or more DC controller from said one or more management control point to said one or more power controller, wherein said one or more power controller updates said present enabled state for each of selected said one or more DC controller;
   h) enabling selected said one or more DC controller by said one or more power controller when said present enabled state is enabled for selected said one or more DC controller; and
   i) disabling selected said one or more DC controller by said one or more power controller when said present enabled state is disabled for selected said one or more DC controller.

2. A method according to claim 1, further comprising the steps of:
   a) recording power demand between said one or more power controller and said one or more DC controller by said one or more management control point.
   b) analyzing said power demand to calculate an inactive signature pattern that occurs when said one or more connected end user device is not being used;
   c) determining, based on said inactive signature pattern, when each of said one or more connected end user device is not in use; and
   d) setting said present enabled state of selected said one or more DC controller that match said inactive signature pattern to disabled, thereby disabling selected said one or more DC controller.

3. A method according to claim 2, further comprising the steps of:
   a) turning on a first calculated number of said one or more power supply, within said one or more power controller to meet said power demand of said one or more DC controller;
   b) turning off a second calculated number of said one or more power supply when said power demand are reduced; and
   c) switching on a third calculated number of said optionally one or more battery when said one or more power supply are being turned on and said one or more power supply are not able to meet said power demand.

4. A method according to claim 1, wherein said connected one or more end user device, comprising: a computer, a AC to DC power supply; wherein said AC to DC power supply is replaced with a said one or more DC controller.

5. A method according to claim 2, wherein said connected one or more end user device, comprising: a computer, a AC to DC power supply; wherein said AC to DC power supply is replaced with a said one or more DC controller.

6. A method according to claim 3, wherein said connected one or more end user device, comprising: a computer, a AC to DC power supply; wherein said AC to DC power supply is replaced with a said one or more DC controller.

7. A method according to claim 1, wherein said connected one or more end user device, comprising: industrial equipment.

8. A method according to claim 2, wherein said connected one or more end user device, comprising: industrial equipment.

9. A method according to claim 3, wherein said connected one or more end user device, comprising: industrial equipment.

10. A system, comprising:
    a) one or more management control point, comprising: a computer;
    b) one or more power controller, comprising: a microcomputer, one or more power supply, optionally one or more battery, a storage means;
    c) one or more DC controller, comprising: one or more DC to DC converter circuit, one or more signal circuit;
    d) a networking means for communicating between said one or more management control point and said one or more power controller;
    e) a distributing power means for connecting said one or more power controller to said one or more DC controller;
    f) a setting means for saving the present enabled state of each of said DC controllers within said one or more power controller;
    g) a command means for sending enable and disable commands from said one or more management control point to said one or more power controller, wherein said one or more power controller updates via setting means, said present enabled state for each of said one or more DC controllers;
    h) a disable means for disabling selected said one or more DC controller when said present enabled state is disabled for said selected one or more DC controller; and
    i) an enable means for enabling said one or more DC controller when said, present enabled state is enabled for said selected one or more DC controller.

11. The system of claim 10, wherein said one or more management control point is programmed to record and analyze power demand to calculate an inactive signature pattern that occurs when said one or more connected end user device is not being used, and said one or more management control point sends said disable command to said one or more power controller, thereby disabling said one or more DC controller that matches said inactive signature pattern.

12. The system of claim 10, wherein said one or more power controller turns on a first calculated number of said one or more power supply to meet said power demand of said one or more DC controller, and
    a) said one or more power controller turns off a second calculated number of said one or more power supply when said power demand are reduced, and
    b) said one or more power controller switches on a third calculated number of said optionally one or more battery when said one or more power supply are being turned on and said one or more power supply are not up to required power demand.

13. The system of claim 11, wherein said one or more connected end user device, comprising: a computer, an AC to DC power supply; and wherein said AC said to DC power supply is replaced with a said one or more DC controller.

14. The system of claim 12, wherein said one or more connected end user device, comprising: a computer, an AC to DC power supply; and wherein said AC said to DC power supply is replaced with a said one or more DC controller.

15. The system of claim 13, wherein said one or more connected end user device, comprising: a computer, an AC to DC power supply; and wherein said AC to DC power supply is replaced with a said one or more DC controller.

* * * * *